Figure 4:
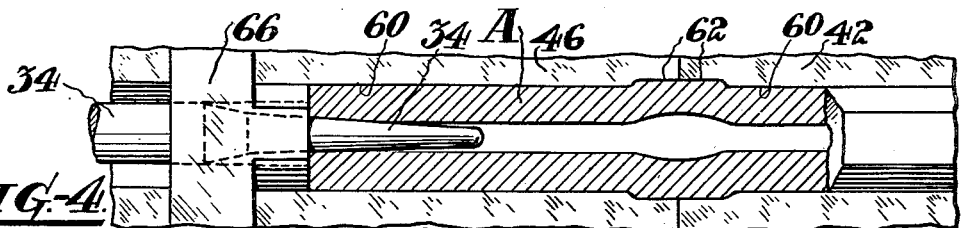

July 11, 1933.  C. C. SICKELS  1,918,060
METHOD OF FORGING HOLLOW WORKING IMPLEMENTS
Original Filed July 3, 1930    2 Sheets-Sheet 1
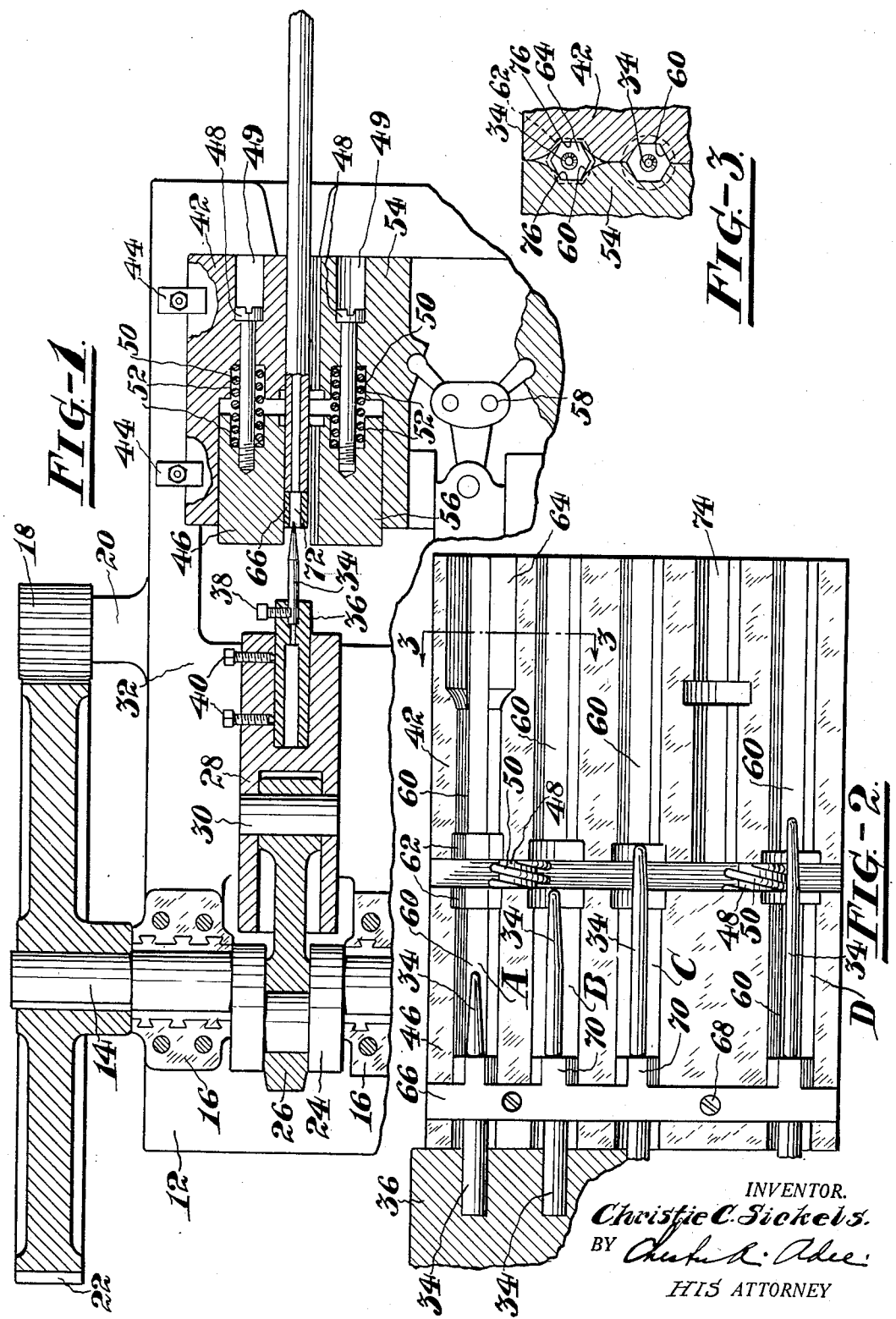
INVENTOR.
Christie C. Sickels.
BY
HIS ATTORNEY July 11, 1933.        C. C. SICKELS         1,918,060
METHOD OF FORGING HOLLOW WORKING IMPLEMENTS
Original Filed July 3, 1930    2 Sheets-Sheet 2

INVENTOR.
Christie C. Sickels.
BY
HIS ATTORNEY.

Patented July 11, 1933

1,918,060

UNITED STATES PATENT OFFICE

CHRISTIE C. SICKELS, OF PHILLIPSBURG, NEW JERSEY, ASSIGNOR TO INGERSOLL-RAND COMPANY, OF JERSEY CITY, NEW JERSEY, A CORPORATION OF NEW JERSEY

METHOD OF FORGING HOLLOW WORKING IMPLEMENTS

Original application filed July 3, 1930, Serial No. 465,556. Divided and this application filed June 25, 1931. Serial No. 546,710.

This invention relates to working implements and more particularly to an improved method of shaping the same.

This application is a division of my copending application Serial No. 465,556, filed July 3, 1930.

One object of the invention is to avoid a weakened section in the implement when upsetting a portion thereof to form a collar.

Another object of the invention is to enable all the shank and collar forming operations to be accomplished on a single forging machine, thus eliminating the necessity of transporting the work from one machine to another.

Another object of the invention is to eliminate the necessity of repeatedly heating the implement during the collar and shank forming operations.

Another object of the invention is to enable a larger number of implements to be punched before the punching pin becomes unfit for use.

Other objects will be in part obvious and in part pointed out hereinafter.

In the drawings illustrating the invention and in which similar reference characters designate the corresponding parts throughout the several views, Figure 1 is a sectional plan view of a forging machine equipped with the forging dies and associated parts with which the working implement is shaped, Figure 2 is a side elevation of one half of the dies and associated parts shown in Figure 1, Figure 3 is a section taken on the line 3—3 of Figure 2.

Figures 5, 6:
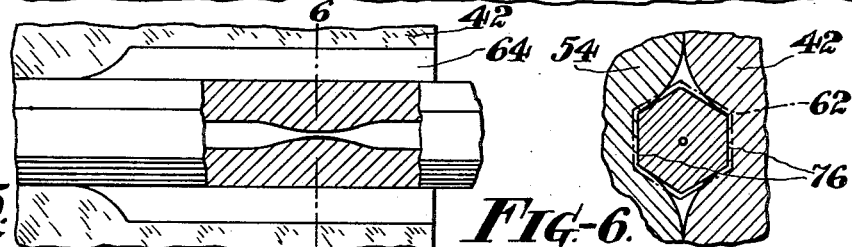
Figure 10:
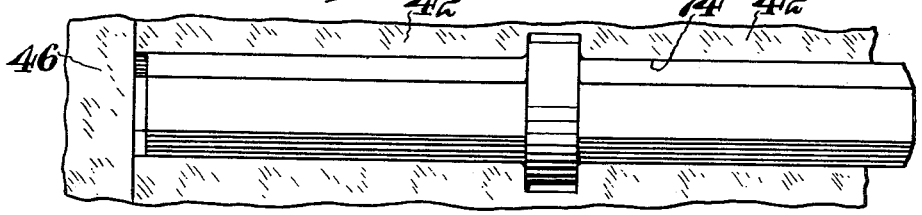

Figure 4 is a side elevation similar to Figure 2 of one portion of the die with a working implement therein to illustrate one of the steps forming a part of the process of manufacture, Figure 5 is a view similar to Figure 4 showing the working implement at another stage of the process, Figure 6 is a section taken on the line 6—6 of Figure 5, Figures 7 to 9 are views similar to Figure 4 showing the working implement during various stages of the process, and Figure 10 is a side elevation of a portion of the die shown in Figure 2 with the working implement in position for the shanking process.

As is well known, working implements used in rock drills and the like are usually formed with a collar thereon to form an abutment for suitable retaining means carried by the rock drill to prevent ejection of the working implement from the guiding element of the rock drill. The working implements upon which this collar is formed are axially perforated in order that cleaning fluid may be conveyed to the hole being drilled. The collar is usually formed intermediate the ends of the working implement by striking one end to upset a portion of the implement into a recess in the holding dies. In order to open the perforation, which becomes partly closed during this operation, a punching pin is usually forced into the working implement and then wthdrawn.

In the use of a rock drill the working implement is subjected to extremely heavy stresses from the constant battering it receives and fracture of this member frequently occurs. As it has been found that many of these working implements fracture at a point adjacent the collar, it is one of the prime objects of this invention to arrange the steps in the collar forming operation so that a uniform section is maintained throughout the implement, thus avoiding the likelihood of fracture at any one point.

One bad feature of prior methods was the use of a single pin for opening the hole after the collar was formed. This process was very destructive to the pin which was necessarily forced a long distance through the hole and very often became "frozen" into the working implement.

Other disadvantages included the use of two machines and an additional heating operation. This added greatly to the cost of manufacture of the working implements which, owing to the bad features accompanying their manufacture, were not extremely durable in use.

All of these disadvantages have been avoided in my invention and a much more economical method of manufacture is made possible together with a great advance in the wearing qualities of the working implements thus produced.

Referring more particularly to the drawings, it will be seen in Figure 1 that the improved method is adapted for use in connection with a common type of forging machine to which the novel features described and claimed in my copending application Serial No. 465,556, filed July 3, 1930 have been applied. The portions of the machine shown comprise a table 12 which is adapted to support a crank shaft 14 by means of bearings 16. The crank shaft is driven through a pinion 18 which, in turn, may be driven from any suitable source of power and supported upon the table by means of a bearing 20. The pinion 18 preferably meshes with a large gear 22 suitably keyed to the crank shaft and by means of which a very slow rotary motion may be imparted to the crank shaft 14. Upon the crank shaft 14 is a crank member 24 having a connecting rod 26 movable therewith and to the connecting rod is secured a header slide 28 by means of the wrist pin 30. It will readily be seen that upon rotary movement of the crank shaft 14 the header slide will reciprocate back and forth along the table where it is guided by suitable guides 32 formed thereon.

The header slide 28 is used in this invention to carry a series of pins 34 of varying lengths which are successively introduced into the usual hole in the working implement to keep it open during the collar forming operation. The pins 34 are held in position in the header 28 by means of a holder 36 into which they are inserted and secured by means of set screws 38. The holder 36 may also have set screws 40 to maintain it in position in the header slide 28.

The dies which are used for the collar forming and shanking operations comprise a fixed die 42 secured to the table 12 by means of the clamps 44, and within the end of the die 42 nearest the header slide is positioned a sliding die 46 which is secured to the fixed die 42 by bolts 48. The heads of the bolts 48 are preferably enclosed in an enlarged bore 49 in the fixed die 42 where they may move freely back and forth in order that the sliding die may move towards and away from the fixed die 42. To maintain each bolt 48 with its head at the bottom of the enlarged bore 49 and thus position the sliding die 46 at a distance from the fixed die 42, a coil spring 50 is inserted in aligned recesses 52 in adjacent faces of the fixed die 42 and the sliding die 46.

Cooperating with the fixed die 42 and sliding die 46 are a pair of similar dies movable transversely towards and away from the former. The cooperating dies comprise a transversely slidable die 54, similar to the fixed die 42, and a die 56, similar to the slidable die 46, and being slidable both transversely and also towards the die 54 to which it is secured by the bolt 48 and spaced therefrom by the spring 50 seated within the recess 52. To actuate the transversely slidable dies 54 and 56 towards the fixed die 42 there is provided a toggle 58 actuated from the crank shaft 14 by means of a cam (not shown). As is usual in these machines the cam is arranged to move these dies 54 and 56 transversely slightly in advance of the forward movement of the header slide 28 and to withdraw said transversely slidable dies slightly behind the rearward movement of the header slide 28.

Referring more particularly to Figure 2 the dies 46 and 42 have a plurality of aligned channels 60 in successive stages along the face of each die and which may be designated A, B, C and D. These channels 60 are adapted to conform to the outline shape of the working implement which may be, as illustrated, of hexagonal form. The aligned recesses are spaced one from the other along the face of the dies in order that forming operations may be carried out upon a single working implement by successively placing it in each channel. Upon the adjacent faces of the dies and forming an annular groove when the dies are closed together are recesses 62 into which the working implement may be upset in successive steps to form a collar thereon. These recesses are graded in shape from A to D, the recess in stage A being the shallowest and longest and that in stage B being a trifle deeper and narrower until the recess in stage D is reached which is the most deep and narrow of them all. The collar formed in stage D may be of finished shape.

At one end of the first channel is an enlarged bore portion 64 shown in section in Figure 3 and shaped as shown therein for a purpose to be described later. This enlarged recess 64 may equally well be formed in any desired channel as will be apparent.

Positioned at one end of the sliding die 46 is a guide member 66 secured thereon by the screws 68 and having projecting portions 70 entering the channels 60 and having an aperture 72 therethrough to form a support for the pin members 34. A special form of recess 74 is provided in the fixed die 42 and transversely slidable die 54, preferably adjacent the lower stages C and D, to align the shank with the body after forming the collar and before the working implement is allowed to cool.

It will be noted from Figure 2 that a plurality of pins 34 are used in the successive stages and that these pins are of graduated lengths from A to D so that each will project an increasing amount into the working implement during the various steps in my improved process.

In the operation of the device a working implement having the desired shape which, for the purposes of this description, may be hexagonal and having the hole therethrough is first heated and then placed in stage A of the fixed dies 46 and 42 with the portion upon which it is desired to form a collar adjacent the recesses 62. The rotation of the crank shaft 14 will first actuate the cam thereon to move the toggle 58 and so close the sliding dies 54 and 56 to grip the working implement in the channel 60. Continued rotation of the crank shaft 14 and crank 24 will move the pin 34 through the guide and into the hole in the working implement until the holder 36 abuts the face of the sliding dies 46 and 56 to urge them against the action of the springs 50 towards the dies 42 and 54. The portion of heated implement in the recess 62 will thereupon be upset to fill the recess 62 in the manner shown in Figure 4 and so form a slightly raised portion thereon.

During this upsetting operation it will be obvious that the portion of implement inside the collar thus formed and adjacent the hole will bulge outwardly and so enlarge the hole at this point. If the implement remained in this condition and the collar was fully formed thereon by upsetting the implement still further, a much weakened section would be formed at this point. In order to avoid this bad effect the implement is removed from stage A and placed in the enlarged recess 64 as shown in Figure 5.

Upon the next movement of the cam actuating the toggle 58 to close the dies together, the upset portion of the implement will be reduced on two opposite sides by the contacting faces 76 of the enlarged portion and this reducing process may be carried out around the contour of the implement by turning it during consecutive closing movements of the dies. During this operation the header 28 will, of course, be moved by the cam towards the die blocks, but as the implement has been moved back towards the enlarged recess 64 it will not be affected by this movement of the header 28.

The development of the implement at this stage of the process is shown clearly in Figure 5 where the outward bulge of the hole shown in Figure 4 has been converted into an inward bulge and a much thickened and strengthened section has been placed on the implement at the point where the collar is to be formed.

This preliminary step in the process assures, in a simple manner, against the development of wrinkles, annular grooves or other weakening defects during the succeeding collar-forming steps. The thickened section or wall is obtained, as described, by displacing material into the hole and it will be understood that the forming of the raised portion for this purpose may be accomplished in any manner and that the preferred method only has been described herein.

Figure 7:
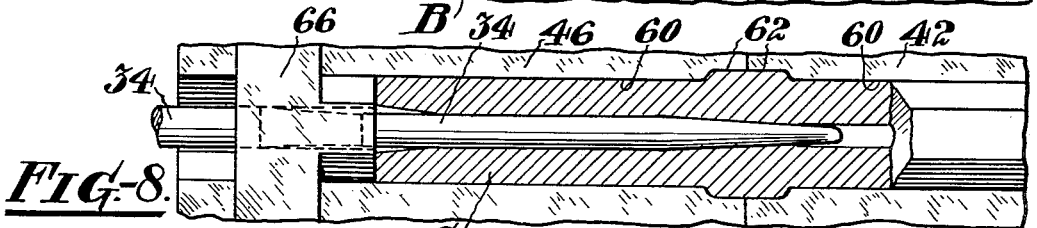
Figure 8:
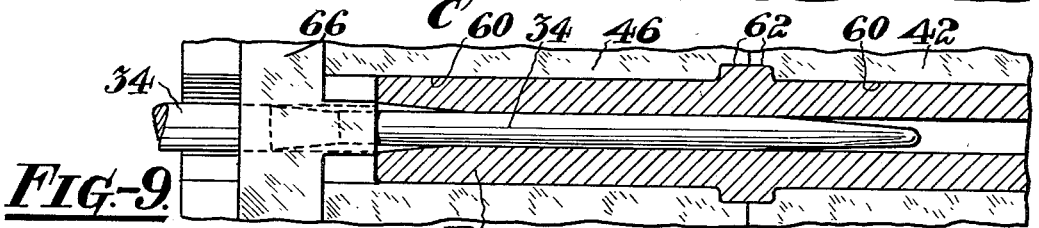
Figure 9:
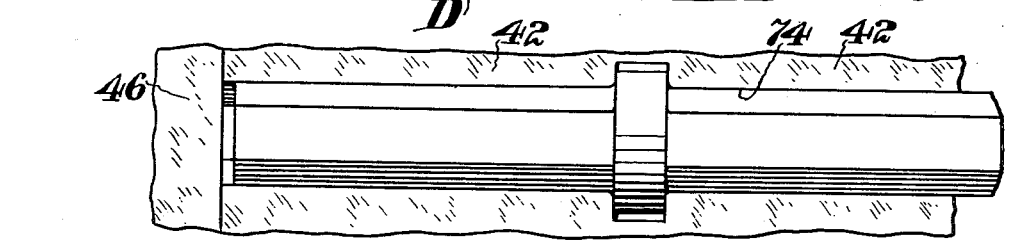

The implement is then placed in stage B and a process similar to the one described for stage A is carried out until it is upset slightly to form a collar thereon. This step is shown in Figure 7 and it will be seen that the pin 34 of longer length than the pin used in stage A projects deeply into the hole to keep it clear to a great extent. Upon removal from stage B the implement is placed first in stage C as shown in Figure 8 and then into stage D shown in Figure 9 where the collar is fully formed by the recess therein which is the deepest and narrowest of all the stages and the hole is gradually shaped to the desired finished diameter by the graduated lengths of the pins 34 throughout these stages.

To true the shank portion of the working implement which may be out of alignment with the body after the collar forming operations it is then placed in the recess 74 where the toggle 58 will actuate the dies 54 and 56 to close upon the implement. Upon removal from the recess 74 the implement may be cooled by suitable means and is completed as far as the collar forming and shanking operation is concerned.

From the foregoing it will be seen that all of the objects of the invention have been attained in an economical manner. It has been found that a great saving in the cost of the pins used for punching the hole is possible from the use of this improved device, as heretofore, when a single pin was used to completely open up the hole it was possible to punch only an average of seven implements before the pin was unfit for use. By using a plurality of pins as in my improved process the number of implements may be greatly increased and frequently over nine hundred have been punched with each pin. Together with this advantage it will be clearly seen that the working implement is not weakened in section at the point where the collar is formed but means have been provided to maintain an even section through the steel. This device has also made the process more economical inasmuch as only one machine is required whereas it has previously been the practice to use two machines, one for collar forming and one for punching the hole, with an additional heating operation between these steps.

I claim:

1. The method of shaping a hollow working implement from a bar having a hole therethrough which consists of forming a raised portion on the external surface of the bar thus enlarging that portion of the hole adjacent thereto, depressing said raised portion to transform the enlarged portion of the hole into a reduced portion and form a thickened section on the bar, and again forming a raised portion on the bar reinforced by the thickened section.

2. The method of shaping a hollow working implement from a bar having a hole therethrough which consists of forming a raised portion on the external surface of the bar, thus enlarging that portion of the hole adjacent thereto, depressing said raised portion to transform the enlarged portion of the hole into a reduced portion and form a thickened section on the bar, again forming a raised portion on the bar reinforced by the thickened section, and expanding the reduced portion until the hole becomes of substantially uniform size throughout the bar.

3. The method of shaping a hollow working implement from a bar having a hole therethrough which consists of inserting a pin a short distance into said hole to prevent deformation of the end thereof, bulging out the wall of the bar to form a raised section on the bar, removing the pin from the hole, then pressing the raised section into said hole, and successively inserting pins of different lengths to open the hole to a uniform size.

4. The method of shaping a hollow working implement from a bar having a hole therethrough which consists of inserting a pin into said hole, forming a raised portion on the external surface of the bar, thus enlarging that portion of the hole adjacent thereto, depressing said raised portion to transform the enlarged portion of the hole into a reduced portion and form a thickened section on the bar, again forming a raised portion on the bar reinforced by the thickened section, and successively inserting pins of different lengths to penetrate the bar to graduated depths and open the hole to a uniform size.

In testimony whereof I have signed this specification.

CHRISTIE C. SICKELS.